(12) United States Patent
Dorenbosch

(10) Patent No.: US 7,395,065 B2
(45) Date of Patent: Jul. 1, 2008

(54) ROUTING CALLS TO FACILITATE CALL HANDOVER

(75) Inventor: Jheroen P. Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 250 days.

(21) Appl. No.: 10/871,626

(22) Filed: Jun. 18, 2004

(65) Prior Publication Data

US 2005/0282575 A1 Dec. 22, 2005

(51) Int. Cl.
*H04Q 7/20* (2006.01)
(52) U.S. Cl. ........................................ 455/436; 455/439
(58) Field of Classification Search ................. 455/439, 455/436, 442, 444, 552.1, 422.1, 445, 550.1, 455/435.1, 435.3, 435.2
See application file for complete search history.

(56) References Cited

U.S. PATENT DOCUMENTS 5,978,679 A * 11/1999 Agre ........................... 455/442
2002/0035699 A1 * 3/2002 Crosbie ....................... 713/201
2002/0085516 A1 * 7/2002 Bridgelall .................... 370/329
2003/0134638 A1 * 7/2003 Sundar et al. ................ 455/435
2005/0148299 A1 * 7/2005 Buckley ..................... 455/41.2

* cited by examiner

Primary Examiner—Naghmeh Mehrpour

(57) ABSTRACT

A wireless communication unit (CU) (FIG. 4), corresponding network controller (FIG. 5), and methods (FIG. 8, etc) operate to route calls and facilitate a call handover from one wireless network to another. The CU comprises a transceiver 403 suitable to support an air interface with a first and second wireless communication network 304, 305; a memory 415 operable to store information 431 suitable for identifying an enterprise controller; and a controller 405 configured to facilitate setting up a call. The controller thereafter if the call needs to be handed over from one to another of the first and second communication network, uses the information to facilitate identification of a unique one of a plurality of enterprise controllers for effecting a hand over of the call.

24 Claims, 5 Drawing Sheets

ROUTING CALLS TO FACILITATE CALL HANDOVER

FIELD OF THE INVENTION

The present invention relates in general to communication units and wireless networks, and more specifically to methods and apparatus for routing and managing calls to effect handover of such calls in networks with multiple controllers.

BACKGROUND OF THE INVENTION

Wireless Local Area Networks (WLANs) are being contemplated or are known. Such WLANs are typically supported by WLAN controllers or servers, which may alternatively be referred to as private branch exchanges (PBXs), enterprise or network servers or controllers. The PBX normally provides a control and switching function between the public switched telephone network (PSTN) and the WLAN and within the WLAN for communication units operating therein or users thereof. The WLAN can be an attractive and inexpensive alternative for typical voice services such as telephony or dispatch services and may provide additional amenities such as high-speed wireless Internet and Intranet access as well as other real-time applications that may be more specific to a given enterprise.

Wireless wide area networks (wireless WANs or WANs) such as conventional cellular telephone systems are also known. Such networks provide the advantage of wide area coverage but may not be economically attractive for routine access to wideband or high speed data capabilities, such as are required for certain Internet or Intranet applications. Nevertheless a communication unit that is operating on a WLAN may move beyond the effective service area for the WLAN and thus need support or services from a WAN. In situations, sometimes referred to as loosely coupled systems, e.g. the WAN is intercoupled to the WLAN only via the PSTN, a communication unit operating on the WAN can experience problems. Generally there is a bias for operating on the WLAN, if that service is available, given the economic and utility issues suggested above, however a handover of an ongoing call, particularly a handin, e.g. from the WAN to WLAN given the loosely coupled nature of these independent networks, can be problematic. This is particularly troublesome when the WLAN is large or complex with multiple sites and multiple network controllers.

While various solutions for handover have been proposed when the WLAN is managed and controlled by a single network controller these do not scale to situations where the network controller that should be used to effect a handover of an ongoing call can not be resolved. Therefore, a need exists for apparatus and methodologies to support routing of calls such that handover of the calls are facilitated, particularly in larger and more complex enterprise networks.

BRIEF DESCRIPTION OF THE DRAWINGS

The accompanying figures where like reference numerals refer to identical or functionally similar elements and which together with the detailed description below are incorporated in and form part of the specification, serve to further illustrate a preferred embodiment and to explain various principles and advantages in accordance with the present invention.

DETAILED DESCRIPTION OF THE PREFERRED EMBODIMENTS

Figure 1:
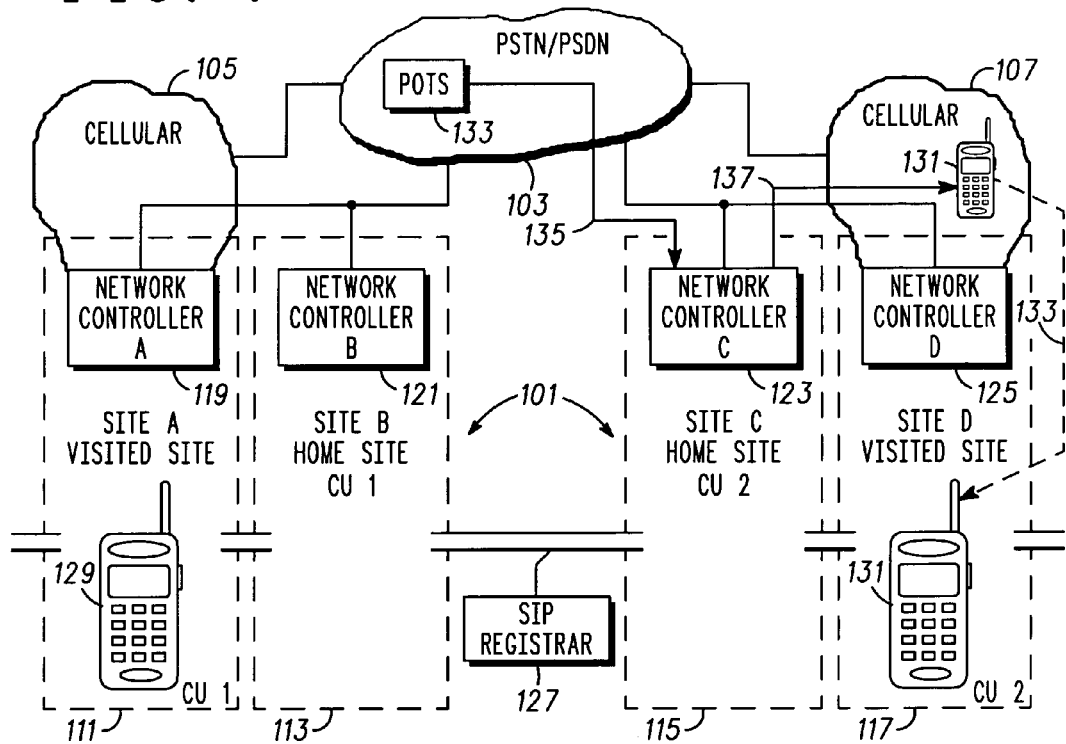
FIG. 1 and FIG. 2 depict, in a simplified and representative form, exemplary system diagrams, where a plurality of network controllers manage an enterprise network.

In overview, the present disclosure concerns wireless communication devices or units, often referred to as communication units, such as cellular phone or two-way radios and the like, and communication networks or systems that provide services such as voice and data communication services to or for such communication units. More particularly various inventive concepts and principles are embodied in systems or constituent elements, communication units, and methods therein for providing or facilitating handover of calls, e.g. ongoing communications between two communication units, where the handover is between a first communication network and a second communication network. These principles and concepts provide for resolving amongst a plurality of network controllers a unique network controller that is suitable for facilitating the handover of the call.

Note that communication unit may be used interchangeably herein with wireless subscriber device or unit and each of these terms denotes a device ordinarily associated with a user and typically a wireless communication unit that may be used with a public network in accordance, for example with a service agreement, or within a private or enterprise network. Examples of such units include personal digital assistants, personal computers equipped for wireless operation, cellular handsets or devices, or equivalents thereof provided such units are arranged and constructed for operation in these different networks and advantageously in accordance with the concepts and principles discussed and disclosed herein.

The communication systems and communication units that are of particular interest are those that may provide or facilitate voice communication services or data or messaging services over cellular wide area networks (WANs), such as conventional two way systems and devices, various cellular phone systems including analog and digital cellular, CDMA (code division multiple access) and variants thereof, GSM, GPRS (General Packet Radio System), 2.5G and 3G systems such as UMTS (Universal Mobile Telecommunication Service) systems, 4G OFDM (Orthogonal Frequency Division Multiplexed) systems, integrated digital enhanced networks and variants or evolutions thereof. Furthermore the wireless communication units or devices of interest have alternative, typically short range wireless communication capability normally referred to as WLAN capabilities, such as IEEE 802.xx (802.11a,b,g, 802.15.x, etc.), Bluetooth, HiperLan and the like that preferably utilize CDMA, frequency hopping, OFDM or TDMA access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

As further discussed below various inventive principles and combinations thereof are advantageously employed to facilitate resolving or identifying a unique network controller out of a plurality of network controllers, where the unique network controller can be used to effect a handover of a call or ongoing communication or communication link from a first wireless communication network (first network) to a second wireless communication network (second network) or vice-a-versa. This resolution or determination of a unique network controller in some embodiments comprises requiring that a wireless communication unit uses a known network controller for setting up or handing over calls. This can be accomplished in certain embodiments by providing the communication unit with an address and telephone number that specify or terminate on a given network controller and thus this controller will be either controlling or at least informed of a call that is being setup or handed over. Other approaches can also be used as will be further described below and include for example having the enterprise network or relevant network controller determine or identify the unique network controller for call set up or handover.

The instant disclosure is provided to further explain in an enabling fashion the best modes of performing one or more embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

Much of the inventive functionality and many of the inventive principles when implemented, are best supported with or in software or integrated circuits (ICs), such as a digital signal processors or general purpose processors and software therefore or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, an exemplary and representative environment or system diagram for a loosely coupled communication network will be discussed and described, where a first network, such as an enterprise network 101 is coupled by a public switched network, such as a public switched telephone network or public switched data network (Internet) 103, to a wide area network(s), such as one or more cellular networks 105, 107. The first network is a multi-site network or enterprise network 101, such as can be encountered in larger organizations with multiple buildings at multiple locations. An enterprise network may thus connect multiple offices of an organization, or multiple campuses of a university. The enterprise network is collectively comprised of multiple sites A-D, etc. 111-117 connected to additional sites (not shown) that are, respectively, managed and controlled by a plurality of network controllers A-D 119-125, where the multiple sites or network controllers are inter coupled by, for example, high capacity links (T1, etc as is known) via the PSTN/PSDN 103 or via another proprietary or leased network of the enterprise.

Each of the network controllers is responsible for controlling calls within its respective local area network. As shown in exemplary form network controller A 119 for the local area network or site A 111 is also a visited site for communication unit 1 (CU1) 129, network controller B 121 is the controller for site B 113 which is the home site for CU1, network controller C 123 is responsible for site C 115 and this is the home site for CU2 131, while network controller D 125 is in charge of site D 117 which is the visited site for CU2. CU1 129 and CU2 131 are dual mode units or devices that are capable of operating in a wireless local area network (WLAN or LAN) using for example IEEE 802.11 protocols to support an air interface as well as operating in wireless wide area or cellular network (WAN) using known cellular protocols for the air interface. Thus the communication units (two shown) are arranged and capable of operating on any of the sites comprising the enterprise network as well as various cellular networks using one or more cellular protocols and each of the CUs will have two phone numbers, e.g. an enterprise number, Ex, and cellular number, Cx, where x denotes the particular CU. A plain old telephone set (POTS) 133 operating on the PSTN and a registrar 127 for determining the present location of wireless communication units is also depicted. The home site of a communication unit CU x can then be defined as the site that is controlled by the home network controller of CU x. The home network controller of CU x can be defined as the network controller 119-125 on which the cellular number Cx of CU x terminates.

The loosely coupled network is characterized by the notion that the two constituent networks, enterprise network 101 and cellular networks 105, 107 are coupled to each other via the PSTN and do not have any means for exchanging proprietary call control signaling. Providing a handover of a call from one of the constituent networks to another without an undue interruption in an ongoing communication is thus problematic. One approach that has been contemplated for doing an acceptable handover (seamless or near seamless) of a call from one, present network to another, new network amounts to establishing a call leg or path on the new network prior to or concurrently with breaking the path on the present network. At the instant of the handover the network controller that is controlling the call couples at least the bearer (payload or traffic) path from one party to the new path for the other party, e.g. party that is being handed over.

Doing this is possible because the cellular network coverage area ordinarily overlaps the coverage area on the local area networks. Doing handovers is desired since the coverage area of any one of the local area networks or sites is limited typically to the area of the site (building) and nearby locations and thus a handover to the wide area network or cellular network may be required when the coverage from the local area network fails. Doing a handover from cellular to the local area network is desirable because the local area networks are typically privately held and economics indicate that calls should be handled by the enterprise network as much as possible. Furthermore additional or expanded services can be available via the enterprise network.

Thus a handover when, for example, CU1 is operating on the LAN can be accomplished by registering with the cellular network and calling a handover number that terminates on the network controller, for the LAN, and when that path is set up, e.g. answered by CU1, switching via the network controller the bearer path from the other party to the newly created path or leg to the cellular network. Similarly when the CU is operating on a cellular network, and it is determined the coverage is available from the LAN, the CU associates with the LAN, contacts the network controller, and the call that is being routed to the cellular network is switched or coupled by the network controller to the CU via the newly created LAN path. However all of this depends on knowing what network controller is handling the call. This is a problem when a plurality of network controllers are available such as depicted by FIG. 1.

For example, suppose the POTS initiates a call 135 to CU2 via the home site network controller C 123 for CU2 and the network controller C routes the call to CU2 137 in a cellular network 107, e.g. forwards the call to C2. If CU2 subsequently associates or moves to 133 the visited site, site D, CU2 will not know what network controller to contact and the call can be dropped.

Figure 2:
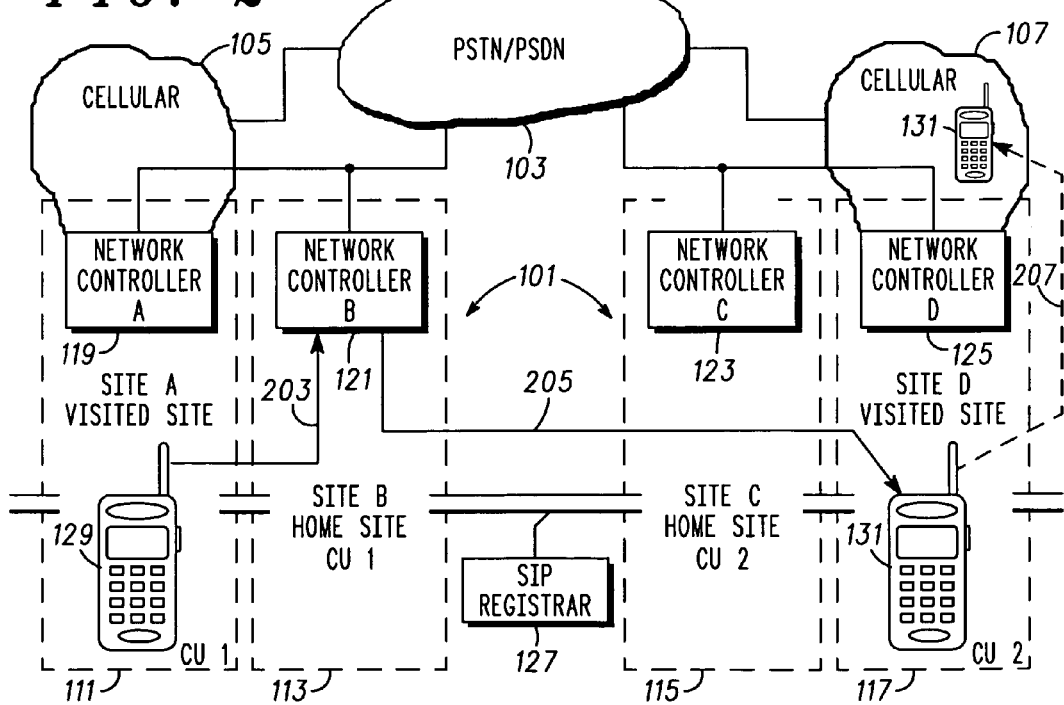

FIG. 2 depicts another exemplary situation. Here CU1 is the call originator 203 via the network controller B 121 for its home site. The network controller B 121 establishes a control and bearer path 205 to the target unit, CU2 131, within the visited site, site D 117. If CU2 then moves 207 to the cellular network 107 it will not know that it needs to call a handover number that terminates on the network controller B 121 and the call can be dropped. Thus successful hand over of calls can require determining a unique one of a plurality of network controllers. Using the inventive concepts and principles described below in the system of FIG. 1 will facilitate identifying the proper network controller.

Figure 3:
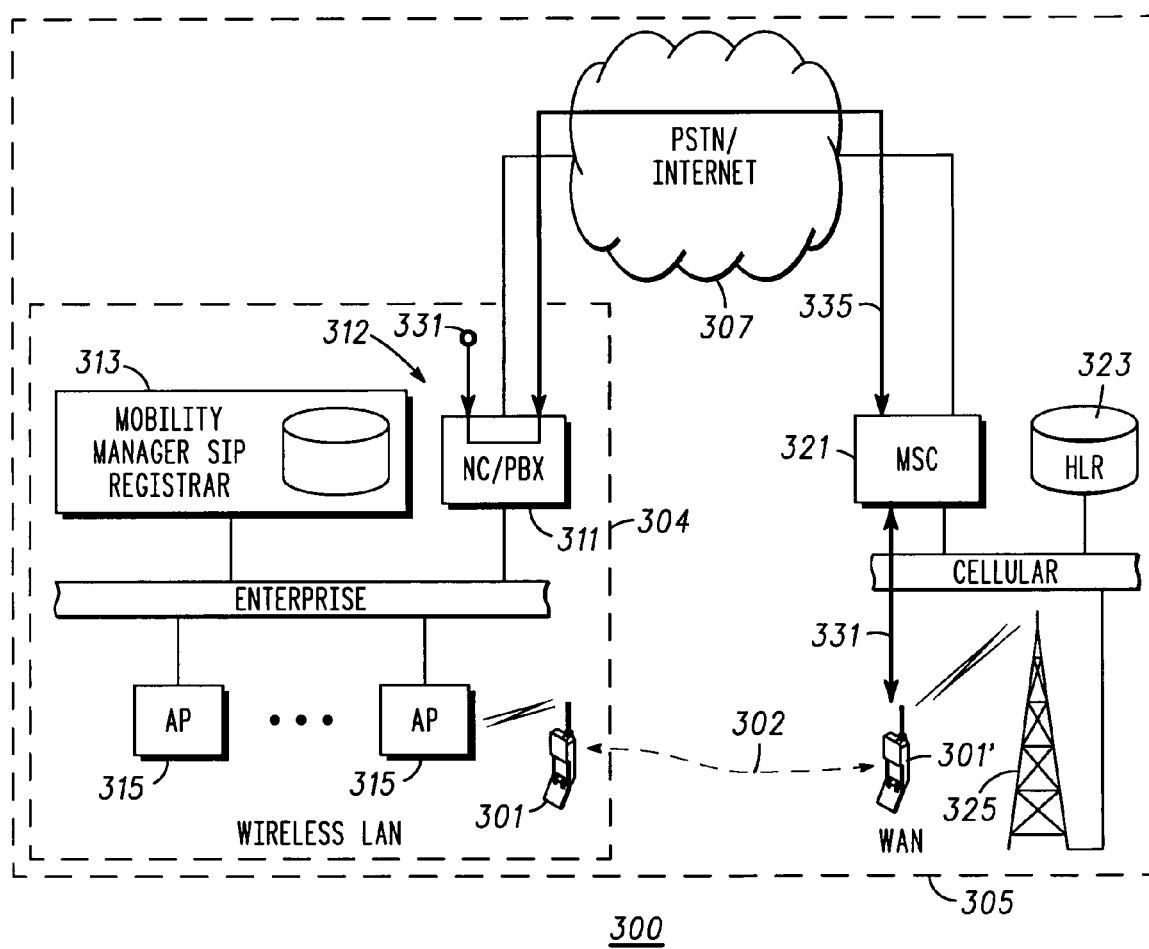
FIG. 3 depicts a more detailed system diagram of one exemplary local area network site and a cellular network.

Next a more detailed system level diagram of a portion of the enterprise network or one site as well as the cellular network will be described and discussed with reference to FIG. 3. The diagram of FIG. 3 generally shows a communication unit 301 (one depicted for simplicity) that is portable or mobile and that can move (depicted generally by arrow 302 and communication unit 301') throughout a service area of a first wireless communication network (first network) 304 or a service area for a second wireless communication network (second network) 305 or both. This wireless communication unit 301 ordinarily has a first network number and IP address so that other units can contact the unit in the first network as well as a second network number or ID (identifier) so that other units can contact the unit in the second network. Note that in practical systems there may be a multiplicity of such wireless communication units where for the sake of simplicity one has been depicted.

In this exemplary embodiment, the first network 304 is or includes a wireless local area network (WLAN) using packet data based methodologies including VoIP (Voice Over IP) and the second network 305 is, in one embodiment, a WAN, such as a cellular voice or packet data network or other cellular or cellular like network otherwise referred to as a wireless or cellular WAN or simply WAN. While the arrow 302 and alternative locations for wireless communication unit designated 301, 301' suggest physical movement, this may not be the case since the WAN likely has overlapping coverage with the wireless LAN. The arrow may simply denote a change in which network the communication unit is operating or registered on for a variety of reasons. The first communication network or wireless LAN is inter coupled to the second communication network as well as various other communication devices such as POTS or IP phones by a public network, such as the public switched telephone network or Internet 307.

Note that in addition to the WLAN 304 additional coverage areas (not depicted) may be included in the WLAN, such as employee homes or remote offices that are associated with the enterprise represented by the WLAN 304. Typically in these circumstances the additional coverage area will often be essentially a radio access network and perhaps router and long distance link, with essential intelligence or switching functions deployed at another site, e.g. WLAN 304.

In more detail, the first network 304 in a wireless LAN embodiment includes a communications network controller 312 comprising in certain embodiments a switching function 311 that may alternatively be referred to as Private Branch Exchange (PBX), enterprise server, media gateway controller (MGC) and so on and an optional mobility manager 313. The PBX 311 and mobility manager 313 are inter coupled via the Enterprise infrastructure or wired portion of the LAN as well as further coupled to one or more of a plurality of access points 315. The access points support the wireless LAN air interface with the wireless communications units using, as noted earlier, a known protocol and associated techniques, such as one or more IEEE 802.xx protocols.

The first network 304 in one or more embodiments further relies on and utilizes an application level protocol for managing connections or sessions between the various network entities including wireless communication units. This protocol in one embodiment is a known Session Initiation Protocol (SIP) but other similar protocols, such as H.323, with similar functionality could be used. The protocol, known as H.323, is defined and promulgated by the International Multimedia Telecommunication Consortium (IMTC) (see http://www.imtc.org/h323.htm and associated websites for descriptive documents). The Session Initiation Protocol (SIP) is defined by the Internet Engineering Task Force (IETF) in a document designated RFC3261. Much of the discussion below, where relevant will assume that SIP and SIP constructs and entities are being utilized in the WLAN and that cellular or dispatch protocols are being utilized in the WAN, where it is understood that similar functions and methods are available using other protocols if desired.

The mobility manager 313 includes, in the SIP embodiment, a known SIP Registrar, SIP Proxy, etc. The mobility manager 313 is responsible for maintaining network contact information (sometimes referred to as location information) for the various wireless communication units and thus is utilized by network entities as a central point for setting up connections or sessions with other network entities. The network controller 312 and mobility manager will be described in further detail below with reference to FIG. 5.

The second network or WAN 305 includes a network controller or switching function 321, alternatively referred to as a mobile switching center (MSC). The MSC is coupled to a home location registrar (HLR) 323 and numerous base transmitter sites (BTS) 325 (one shown), as known to those skilled in the art. The MSC 321 further comprises a visitor location registrar (VLR not specifically shown) as is known. The BTS 125 supports the air interface with the wireless communication unit, such as unit 301', e.g. unit 301 when this and similar units are in the coverage area of and operating on the second network. Note that first and second networks will be used in the description but these terms may be interchanged, e.g. the first network could be a WAN and the second network a WLAN, or both could be WLANs for example, provided the appropriate functionality is available within such networks.

Also it will be appreciated that other entities or functions that are part of typical networks are not specifically shown but understood to be present and operational. For example in the first network 304 or WLAN, in addition to a multiplicity of Access Points 315 supporting wireless links with wireless communication units and thereby coupling the units to the balance of the network or enterprise network and PSTN, other typical network routing equipment such as servers, concentrators, routers, etc. may be present. The second network or wireless WAN (hereafter WAN) similarly typically includes a plurality of base transmitters and antenna towers as well as base site controllers that all serve to provide a radio access network for communication units as well as the various registrars, billing servers and so forth. Note that while the first and second networks 304, 305 are referred to as wireless networks, much of these networks or the respective elements thereof are inter coupled using terrestrial based links, e.g. cables or wires. For example, the controller functions 312, 321 are normally coupled to the balance of their respective networks using known cables or wires. Furthermore the WLAN 304 can include and support voice services for stationary or static communications units that are coupled to the network using conventional cabling or wires. Thus the discussions below may refer alternatively to the first communications network 304 as a WLAN or LAN. Calls 331 originating in the LAN or terminating at the LAN, network controller 312, can be forwarded 335 to the cellular network and then coupled 331 to the communication unit 301'.

Figure 4:
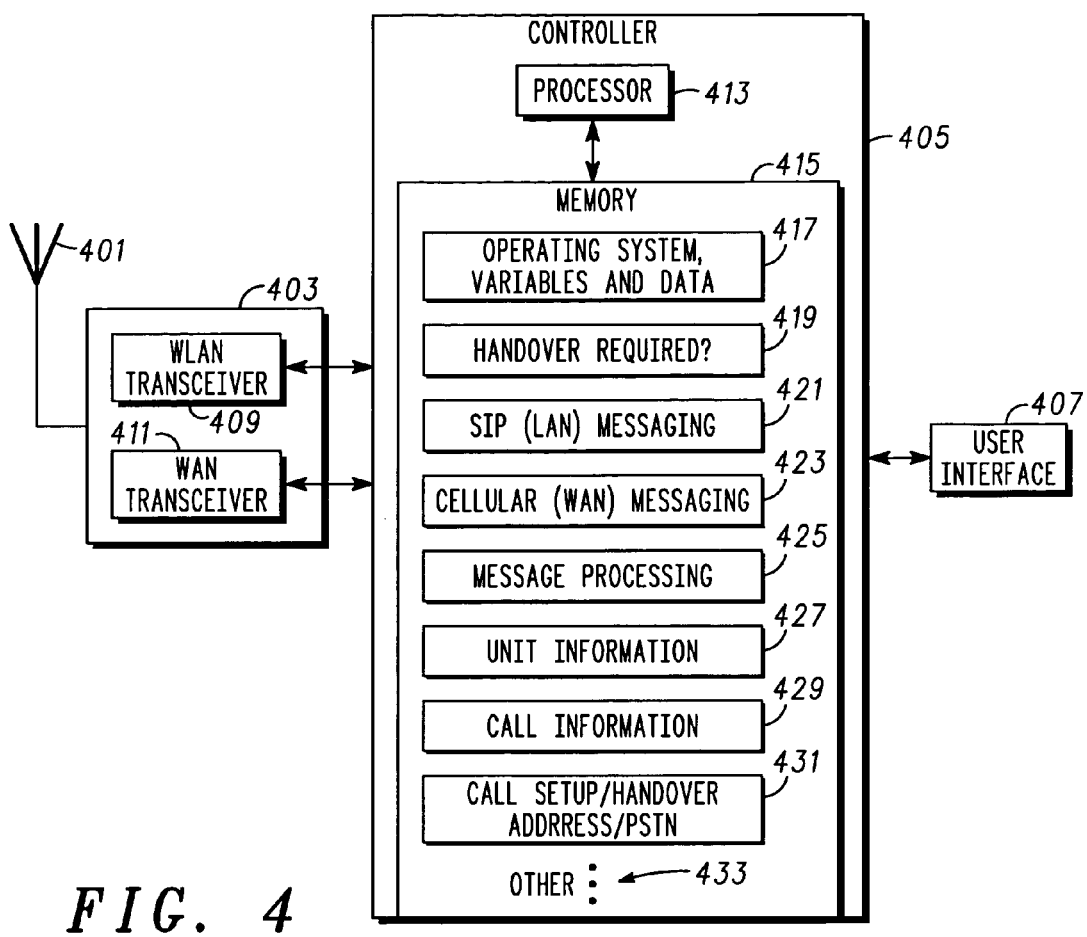
FIG. 4 depicts a simplified block diagram of a wireless communication unit arranged for facilitating hand over of a call in the system of FIG. 1-FIG. 3.

Referring to FIG. 4 a simplified block diagram of a wireless communication unit, similar to CU1 329, CU2 331, or unit 301 that is arranged for facilitating setting up a call to facilitate identification of a unique enterprise controller to effect a hand over of the call will be discussed and reviewed. The communication unit is structurally similar or identical to communication units, such as wireless handsets, available from manufacturers like Motorola, however the functionality of these conventional units is modified according to the principles and concepts disclosed and described herein in order to enjoy the advantages noted. The communication unit includes an antenna 401 coupled to a transceiver 403. The transceiver 403 is composed of at least one transmitter/receiver but may, as depicted, be comprised of one or more WAN transceivers 411 (one shown) and one or more additional wireless LAN transceivers 409 (one shown). In one embodiment, one transmitter/receiver 411 is for communicating over a wide area network (WAN) (second wireless communication network) while another transmitter/receiver 409 is for communicating over a wireless LAN (first wireless communication network). These transceivers and their functionality are generally known and whether embodied as one or several transceivers will depend on technologies employed as well as the air interface technologies utilized in the specific WANs and LANs that the communication unit is configured to interface to or interact with.

The transceiver 403 is coupled to a controller 405 and the controller is further coupled to a user interface 407. The controller 405 provides overall control for the communication unit, call processing, and interfacing tasks associated with the transceivers and user interface. The user interface includes a conventional display, a keyboard or keypad, audio transducers, and the like. The controller 405 further comprises a processor 413 and a memory 415 for storing software instructions and other information and data, the memory and processor inter coupled as depicted, as well as likely other known functionality that is not relevant to the present discussion. The processor is comprised of one or more general purpose processors and digital signal processors available from various suppliers, including Motorola. The memory 415 can include both volatile and non-volatile memory and can be at least in part integral to the processor 413 or may also be external to the processor and include elements from, for example, a known SIM card.

The memory includes various software routines or programs and data including an operating system with variables and data 417 that when executed by the processor results in the controller performing the above generally identified duties as well as those tasks described below in conjunction with other routines. The other routines or programs include a handover required determination routine 419 and call processing routines for WAN and WLAN networks further including, for example, SIP messaging 421 and WAN messaging 423 that are generally known and will vary with the specific requirements of the networks that are being utilized for service. Other routines and databases will be listed and their respective functionality will become evident with the detailed explanations below. These routines include message processing 425; unit information database 427, and call information database 429, call setup or handover addresses and phone numbers 529 and other routines 433 and databases such as network scanning routines, phone books and assorted information, user specific information, user interface drivers and various applications that are not specifically shown and not further relevant but that will be evident to one of ordinary skill.

In operation, the communication unit of FIG. 4, is capable of and arranged and constructed for operating on or operation within a loosely coupled communication network comprising multiple communication networks, such as wireless LAN 304, or the enterprise network 101 as well as wireless WAN 305 or cellular networks 105, 107. The wireless communication unit comprises the transceiver 403 that is configured to support an air interface with a first communication network, for example wireless LAN 304 and an air interface with a second communication network, for example WAN 305. Furthermore the communication unit comprises the user interface 407 that is operable to initiate a call to a number of a target unit or otherwise indicate or suggest that initiation of such a call is imminent (recall phone numbers, etc) and to accept a call resulting from a setup request from another communication unit. The memory 415 is arranged and operable to store information for identifying an enterprise controller, such as unit information 427 or call setup or hand over addresses and phone numbers 429, where the addresses can be LAN addresses for a particular network controller and the phone numbers can be numbers that terminate on a particular network controller.

The controller 405 is configured and cooperatively operable with the transceiver to facilitate setting up a call, e.g. initiate a call request or answer a call request as is known. Furthermore, when the call has been setup, using the call processing, e.g. messaging routines 421 or 423 and then needs to be handed over, as determined by the controller 405 using the handover routine 419, from one to another of the first and second wireless communication networks, the controller uses the information stored in the memory to facilitate identification of a unique enterprise controller of the plurality of enterprise controllers, where the unique enterprise controller is for effecting a hand over of the call. The handover routine 419 will assist with determining for example that the WLAN coverage is failing, e.g. signal strengths are dropping or the like or that WLAN coverage is available or vice-a versa and thus a handover is indicated.

Note that the information may be stored in varying forms but is in a form that the controller 405 is operable to process the information and thus provide an address suitable for contacting the corresponding enterprise exchange. For example the information processed by the controller can correspond to one or more of: an Internet Protocol (IP) address; a Uniform Resource Indicator (URI); an alphanumeric string; a phone number; or an index to a table of addresses stored in the memory. The IP address or URI would be the address or network indicator for the enterprise controller. The phone number would be a PSTN telephone number that terminates on the unique enterprise controller and the alphanumeric string can be characters that combined with other known characters allows a URI to be formed, e.g. nc 123 could be used to form nc123@wlan.net for example and thus provide an address for network controller 123. The information can be an index that when followed to a table of, for example, addresses, phone numbers, or the like allows an appropriate one, e.g. one pointing to the enterprise controller to be selected by the controller.

The information may be obtained by the wireless communication unit in varying manners. For example in one embodiment, the controller cooperatively with the transceiver; receives a message corresponding to a call setup for the call, determines whether the information is included with the message via the message processing routine 425, and when the information is included in the message, stores the information or corresponding portions thereof in the memory. Note this message corresponding to a call setup can be a call setup request message received by a target communication unit, a message in response to a call setup request received by an originating unit, or another message that is received as part of the call setup procedure.

For example, the message can comprise a setup message including a calling party or called party number or identification and the information can be inserted or appended with either of these fields. For example, the transceiver can receive the message while operating in the second wireless communication network (WAN) and the information can be inserted in this message by the enterprise controller or another enterprise controller where the other enterprise controller is one that was in the path of the setup message. In any event given that a call has been setup for example in the WAN, the controller cooperatively with the transceiver can operate to associate with the first wireless communication network (WLAN) and contact the enterprise controller corresponding to the information to initiate the hand over of the call.

Other approaches for obtaining the information include for example, the information being provided to the controller and stored in the memory during one or more of: a provisioning process for the wireless communication unit, a registration exchange with one of the plurality of enterprise controllers, and an overhead message while operating on the first wireless communication network (LAN). Note that a registration exchange with one of the plurality of enterprise controllers can include getting the information while registering with another entity associated with the controller 313, such as the mobility manager, configuration server (not shown), SIP registrar 127, etc. When the communication unit is originally put in service in the enterprise network a LAN address and phone number or table of such information can be programmed into the memory of the unit. When the communication unit enters and registers at a particular local area network the information can be provided. The information can be provided from time to time in an overhead message while the unit is operating in the LAN, for example by regularly broadcasting an overhead message to all wireless CUs. The particular approach is likely to depend on perceived management overhead for the various approach from a network administrative perspective.

Given the information, the controller cooperatively with the transceiver can, for example, operate and use the information to contact the enterprise controller and initiate a call setup or call handover using the unique enterprise controller. Note that the enterprise controller that is contacted can be the unique enterprise controller or another enterprise controller that forwards the call setup request to a known and thus unique enterprise controller. Normally the controller cooperatively with the transceiver is operable to use the information to contact the unique enterprise controller where the contact uses a local area network address when the wireless communication unit is operating in a wireless local area network and a public switched telephone number that terminates on the enterprise or unique enterprise controller when the wireless communication unit is operating in a wireless wide area network.

In other embodiments the controller is operable to contact the enterprise controller corresponding to the information to initiate the hand over of the call from one of the first wireless communication network and second wireless communication network and detect that the hand over failed. In the event of a failure, e.g. when the handover fails, the controller can put the call on hold in the first wireless communication network or the second wireless communication network, establish another call to itself from the one of the networks to the other of the networks, and continue the call on the other of the first and second wireless communication network by transferring the call that is on hold to the other call that has been setup. The call can be transferred to the other or a new call by, for example, the one of the first and second wireless communication network transferring the call to the other call.

For illustration assume that the CU 301' needs to hand over the call from a cellular WAN 305, 105 to the WLAN 304, 111. When the CU 301' determines the need to hand over while moving 302 into the WLAN, it contacts the enterprise controller 112 corresponding to the information to initiate the hand over of the call. Normally this will result in a handover, but rarely the CU may detect that the hand over failed. A handover may fail for various reasons, for example when a peer 133 in the call is in the PSTN, and is connected directly to the CU 301' via MSC 321, without the call passing through one of the network controllers 119-125. The failure preferably will be communicated to the CU 301' in an error message from an enterprise controller.

When a failure is detected the CU 301' may be able to avoid dropping the call with a method that is not completely seamless or transparent. When the handover fails, the CU 301' will request from its old network, the WAN 305, to put the call on hold. The request will be received and executed at the MSC 321 which will hold the call leg with the peer 133 and suspend the call leg with the CU 301'. Since the CU 301' is also associated and registered with the WLAN as CU 301, the CU 301' can now request the MSC 321 to setup another call with a number that represents the CU itself 310 in the WLAN 304. After the other call connects, the CU 301' request the MSC 321 to transfer the call to the other call. As a result the MSC 321 will connect the held call leg of the peer 133 with the call leg of other call that connects to CU 301 in the WLAN 304. The CU 301 can now continue to communicate with the peer 133. All of these operations are executed by the CU 301', 301 automatically on detection of the failure without help from the user of the CU. During these operations communications will be interrupted for a short duration. The CU preferably plays some information, beeps, or tone to the user during the operation. The CU may also warn the peer, just before putting the call on hold.

Figure 5:
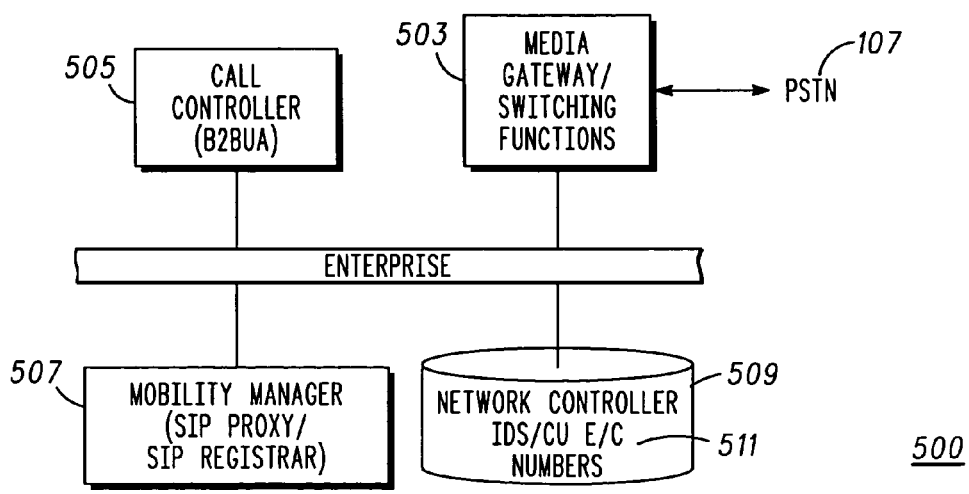
FIG. 5 depicts a simplified block diagram of a network controller for facilitating handover of a call.

Referring to FIG. 5, a simplified block diagram of a network controller 500, such as the network controller 112, 119 etc, for controlling an enterprise network or portion thereof and facilitating handover of calls in the system of FIG. 1 will be discussed and described. The network controller 500 will generally serve a single enterprise location, such as an office building, university campus, or the like. The network controller 500 or enterprise server/controller may also serve a WLAN hotspot, or multiple WLAN hotspots or one or more WLAN coverage areas in private homes that may be connected to the network controller 500 by such means as IP broadband connections. Generally the network controller operates to establish connections between wireless communication units within the WLAN, such as communication units 129, 131 and various peer communication units (not shown). Note that the connection from the wireless communication unit via an access point 315 is a packet data connection and the connection from the peer communication unit will depend on the particulars for the peer unit. For example if the peer communication unit is another static or wireless communication unit within the WLAN or LAN (not shown) the connection will also be a packet data based connection, while if the peer unit is an ordinary phone, such as POTS 133, or from a wireless communication unit 301', outside the LAN or WLAN 304 the connection to/from the wireless LAN is often a circuit switched voice connection.

The communication network controller 500 comprises a gateway or switching function 503 and a call controller or controller 505 including a B2BUA (back to back user agent, a SIP entity) such as available from Avaya with their Multi-Vantage product line. Rather than the B2BUA, a conventional SIP server can be used. Generally the gateway or switching function operates to couple the wireless LAN and devices therein to the PSTN 103 and thus external phones, such as POTS 133, and other networks, such as the WANs 105, 107. More specifically the switching function is routing traffic or calls between the various devices and networks. The controller 505 is responsible for call control and call signaling and handling on-hold or call waiting calls, hairpinned calls, call transfers, etc. and handling connections of these calls among particular communications units. The B2BUA is included as part of the controller 505 to facilitate an interface using SIP constructs between the controller and the rest of the LAN including access points, communications units, the switching function 503, a mobility manager 507, and a server 509 where the server among other items includes a database that cross references network controller IDs or identity information with communication unit enterprise/cellular, E/C, numbers, URIs or identity information.

The mobility manager 507 is included in certain embodiments of the network switch or controller 500 and further often comprises a SIP Proxy and SIP Registrar. The mobility manager 507 operates to facilitate mobility of the wireless communication units within the wireless LAN as well as between networks. This includes facilitating handover (handin or handout) for active calls and on-hold calls associated with communication units from one to the other network or within the wireless LAN when required. The SIP proxy and SIP Registrar operate according to known techniques to provide a central point or network address that all communication units can contact when they intend to set up a call or connection with another unit. The proxy server/SIP Registrar will have the most up to date network contact or location information for or address, e.g. know where to find, another communication unit or the network switching function 503 in accordance with known techniques. The mobility manager and constituent functions in one or more embodiments can be implemented as software programs running on a general purpose, computing platform, such as those available from suppliers, like Hewlett Packard and Dell that are suitable for networked operation.

As noted above, in some embodiments, the server 509 is included and operates as a memory associated with the controller 505 or mobility manager 507 for storing a look up table of information suitable for facilitating hand over of calls as will be discussed below. The server 509 may be a separate entity and available to multiple network controllers in an enterprise or be part of the mobility manager or each call controller. The switching function 503, call controller 505, mobility manager 507, and server 509 are all inter coupled or networked via the LAN as depicted. Note that one or more or all of these entities may be co-located in one or more common computing platforms according to the practitioner's desires and thus may be viewed as largely logically distinct entities. Generally the functionality of these entities and interaction thereof are known and will not be further reviewed but will be modified in accordance with the concepts and principles herein in order to enjoy the advantages thereof. The discussions below will be devoted to the respective and relevant functionality and interaction of these respective entities with each other as well as other network entities pursuant to facilitating routing and hand over of calls for a wireless communication unit.

Thus in operation, the network controller 500 in addition to other duties is operable to control a part of an enterprise network and manage, control, and route calls for wireless communication units and among other duties facilitate hand over of calls for wireless communication units 129, 131, etc. The network controller comprises a switching function 503 that is coupled to the local area network 111-117, 304 and the wide area network 105, 107 via for example the public switched network 103, 307 and the local area network. The network controller further comprises a controller coupled to the switching function and the local area network that is operable to facilitate identification of a unique network controller of a plurality of network controllers to thereby effect a handover of a call between the enterprise network and a wide area network. In one embodiment, the controller; receives a call setup request for the call from a wireless communication unit, determines the unique network controller, and forwards the call setup request to the unique network controller, whereby the unique network controller will setup the call.

The controller determines the unique network controller by one or more of various techniques, such as accessing a database 511 to identify the unique network controller associated with the wireless communication unit or analyzing calling party identification of the wireless communication unit. In another approach, the controller determines the unique network controller by accessing a database to identify the unique network controller associated with a target wireless communication unit or analyzing called party identification of the target wireless communication unit.

In some embodiments the network controller or the controller; receives a call setup request for the call from a wireless communication unit, determines the unique network controller, and notifies the unique network controller when the call is being setup and when the call ends. If the call that is setup is later subject to a handoff request the unique network controller may get that request. Thus the controller after notifying the unique network controller when the call is being setup, can receive a request for the handover of the call from the unique network controller and then presumably operate to effect the handover, e.g. couple the other party to a newly established call, for example, in the LAN.

Figure 6:
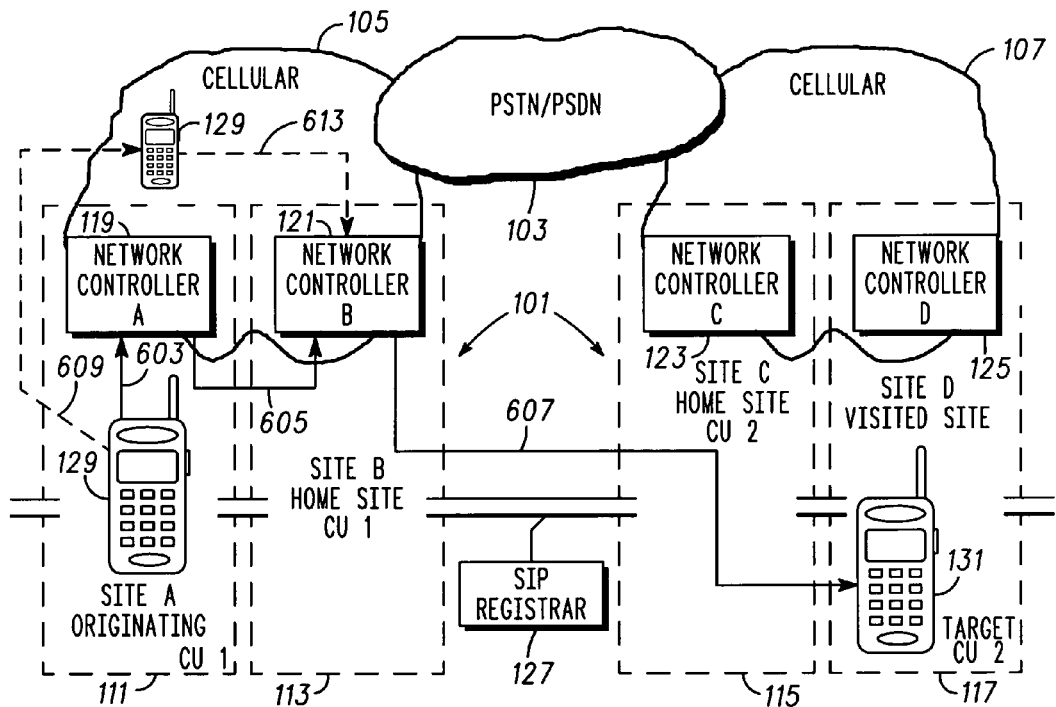
FIG. 6 and FIG. 7 depict other embodiments showing call routing for facilitating hand over of calls in the system of FIG. 1.

Referring to FIG. 6 another exemplary embodiment showing call routing and setup for facilitating call handover will be described and discussed. FIG. 6 generally depicts the situation where the originating communication unit is provisioned with an address and phone number for the network controller where all call setups and handover requests will be directed. In FIG. 6 CU 129 is the originating CU or party. CU1 has been provisioned or otherwise obtained a LAN network address (IP address or URI) for as well as a phone number terminating on a unique network controller, e.g. its home site network controller B 121. Thus CU1 sends a call setup request 603 to the visited site network controller 119 and the setup request is forwarded 605 to network controller B 121 and the call is setup 607 with CU2 131 at the target visited site D 117. If CU1 subsequently moves 609 into the cellular network 105, CU1 can call 613 the phone number that terminates on network controller B 121 and the controller B can couple the call leg with the target unit, CU2 to the new call leg with CU1.

It is reasonably straight forward to setup a call or request a handover from the enterprise, e.g. WLAN. The CU can send a SIP INVITE, a SIP REFER or an equivalent H.323 or proprietary message to the specified address (e.g. LAN address). It may not be trivial to setup a call from the PSTN/cellular via the predetermined network controller or PBX, since the CU may have trouble determining, for example, that a desired target PSTN number terminates on the provisioned PBX. If such a determination can not be made, the CU must set up the call using double dialing: the CU first dials the provisioned number (phone number) that terminates on the provisioned PBX, network controller B 121 in FIG. 6 and then continues to dial the desired PSTN number (inside the setup message or via DTMF). The PBX sets up a call leg to the desired number and connects it to the call leg from the originator.

A CU may not always want to use a predetermined PBX to set up a call. For example, to set up a call from cellular, the CU may prefer to double dial using a known 800 number to reach the PBX. This can be cheaper, because as is known the 800 number can be set up to always route to a local enterprise PBX or network controller. In these cases the CU can be provisioned or programmed with an enterprise network address (IP address or URI) and an external PSTN number that terminate on the same PBX via one of the approaches noted above. For example this could be the CU's home PBX. The CU will always use the address/number to request handover for a call of which it is the originator. The CU can use another PBX for call setup requests, e.g. a local 800 number.

The local and all other network controllers in the enterprise are configured to determine which predetermined PBX, e.g. unique network controller will be used for a handover request by a CU that does a call setup request, e.g. using an 800 number (doing a database lookup, deriving from the CU enterprise PSTN number, etc. as earlier discussed). When a PBX or network controller receives a call setup request from a CU, the receiving PBX determines the unique handover PBX of the CU and, if it is not that PBX that received the request, the receiving PBX routes the call setup request to the handover PBX. That way the CU's handover PBX will be involved in the call and can do a handover, if requested later by the CU. As noted earlier, the receiving PBX does not have to route the setup request to the predetermined or unique network controller or handover PBX. Instead it can set up the call itself and informs the predetermined handover PBX of the start (and the end) of the call. When the CU requests a handover from the predetermined handover PBX, the predetermined handover PBX then forwards the request to the PBX that is controlling the call.

Figure 7:
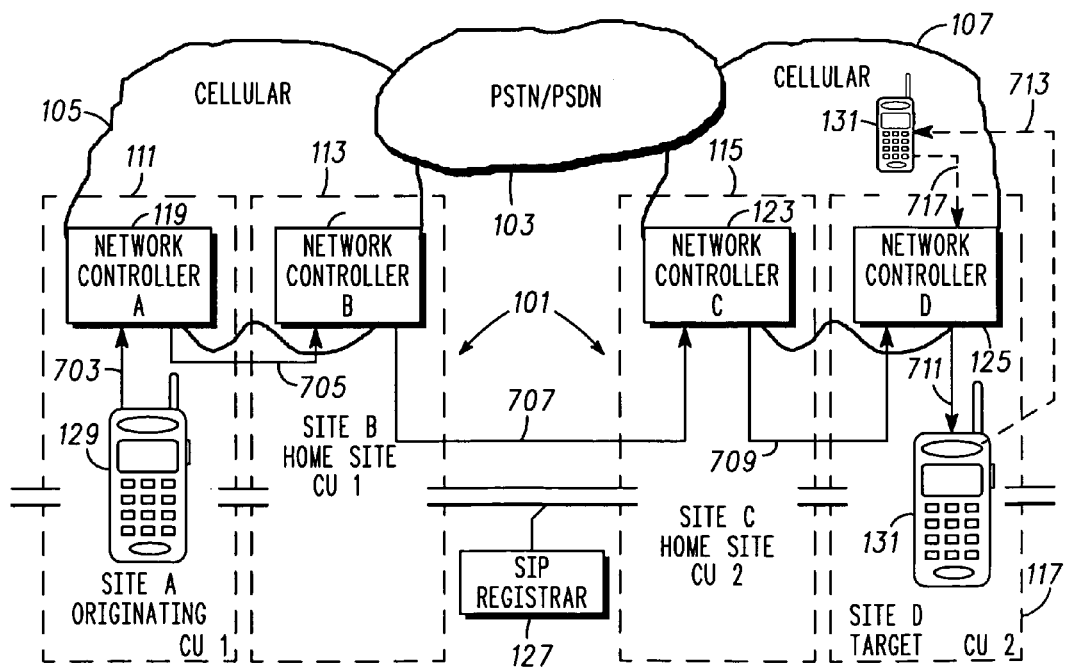

Referring to FIG. 7 another exemplary embodiment showing call routing and setup for facilitating call handover will be described and discussed. FIG. 7 generally depicts an approach of providing a unique network controller for a target communication unit 131. It is further noted that not all of the approaches discussed below are compatible with all of the approaches noted above, however one of ordinary skill will appreciate this given the discussions herein. Providing a unique network controller for a target communication unit is not always straightforward since originating unit 129 can not always determine the unique network controller (e.g. controlling network controller or contact network controller) for the target. This network controller will alternately be referred to as the target's handover PBX. One solution is to make all calls to the target's enterprise number, when calling from the PSTN. The call will then be routed to the target's home PBX or network controller C 123. Calls from the WLAN would have to be made to <tel:enterprise number> using SIP constructs and this would force the originating PBX to route the call to the target's home PBX, likely via the PSTN, although this can be expensive.

Another approach specifically depicted in FIG. 7 relies on provisioning or programming the target communication unit with a network address and phone number that will be used by the target unit for setting up any call handovers. The target CU is provisioned or programmed with an enterprise network address (IP address or URI) and an external PSTN number that terminate on the same PBX, e.g. defines the unique network controller for effecting handovers for the target unit. The CU will use the address/number to request handover of any call for which it is the target. The originating and target CUs can use other PBXs for call setup requests.

In this situation the enterprise infrastructure, e.g. all of the network controllers are configured and arranged or programmed to determine which predetermined PBX or unique network controller will be used for handover requests by the target CU 131 (database lookup, derive from CU enterprise or PSTN number of the target, etc.). When a network controller, such as network controller A 119 or PBX receives a call setup request 703 for that target CU 131, the receiving network controller can route 705 the setup request to the unique or predetermined network controller, such as B 121 for the originating CU 1 129. The unique network controller B 121 can then determine the predetermined handover network controller or PBX of the target CU and, if it is not the network controller B or PBX itself, the network controller B can route 707 the call setup request to the target handover PBX, such as home network controller 123 or the visited network controller 125 for the target CU. If the home network controller C is not the unique or predetermined network controller the home network controller for the target CU can forward 709 the setup request to the visited network controller D. Alternatively the receiving network controller A 119 can determine the predetermined handover network controller or PBX of the target CU and, if it is not the receiving network controller or PBX itself, the receiving network controller can route the call setup request to the target handover PBX. In these manners the target CU's handover PBX, shown as the visited network controller D 125 will be involved in the call and can do a handover, i.e. after the target CU moves to cellular 713 and if so requested later by the target CU 717.

The handover PBX of a target will likely be the target CU's home PBX or the PBX of its visited enterprise site. In the later case, each CU must be provisioned when it enters the WLAN of the visited site with its target handover PBX information. A variation allows the target CU to automate the forwarding of the setup request to a predefined PBX, so that the requesting PBX does not need to go to an additional database. Normally a CU would register contacts into the SIP registrar 127 that are of the form:

Contact: <tel:target_phone_numer>and/or

<sip: target_name@target_host_address>

Instead, for this variation, the target will use contacts of the form:

Contact: <sip: tel:target_phone_numer@predefined_handover_PBX_address>and/or
<sip: target_name%40target_host_address@predefined_handover_PBX_address>.

This will result in the routing of each SIP INVITE to the target CU via the predefined PBX. That PBX then removes its host name 'predefined_handover_PBX_address', replaces the '%40' with a '@' or a ':' as appropriate and sets up the call to the remaining URI.

Another variation is where the receiving PBX does not route the setup request to the predetermined handover PBX of the target, but sets up the call itself and informs the target's handover PBX of the start and the end of the call and of its own identity, so that the handover PBX can later contact the receiving PBX. When the target SU requests a handover from its predetermined handover PBX, the predetermined handover PBX forwards the request to the PBX that is controlling the call.

As noted earlier if a handover of an ongoing call fails, normally the predefined PBX handling the call will then return an error indication to the CU. When the CU receives the error indication, it can attempt a backup handover method. The backup method will likely produce an audio gap, which is why it is less preferred, but may be much better than no handover (which results in a dropped call).

In the following description we use the terms old side and new side. The old side is the system that the CU is moving from, the new side is the system it is moving to. For example, in the case of a handin, the CU is moving from the old cellular side to the new WLAN side. The backup method is executed by the CU, without the help of the end-user as follows.

- The moving CU puts the peer on the old side of the ongoing call on Hold (if the CU is in cellular, this can done using Supplementary Services, in the WLAN it can use SIP). This results in a call leg that is being held by the infrastructure (cellular switch, PBX, or PSTN switch).
- The CU initiates a new call from the old side to itself on the new side (if the CU is in cellular, it dials its enterprise number, if it is in the WLAN, it requests a call to its cellular number.
- After the new call connects, the CU requests, via the old side that the held leg be transferred to the new call. (In cellular this is called an Explicit Call Transfer. It is standardized in GSM 04.91. In the WLAN, the CU uses the SIP REFER method).
- The CU now connects its audio to the new leg. The end-user will be talking to the peer via the new side.
- If needed, the CU can tear down the call on the old side (ECT will tear it down automatically).

Figure 8:
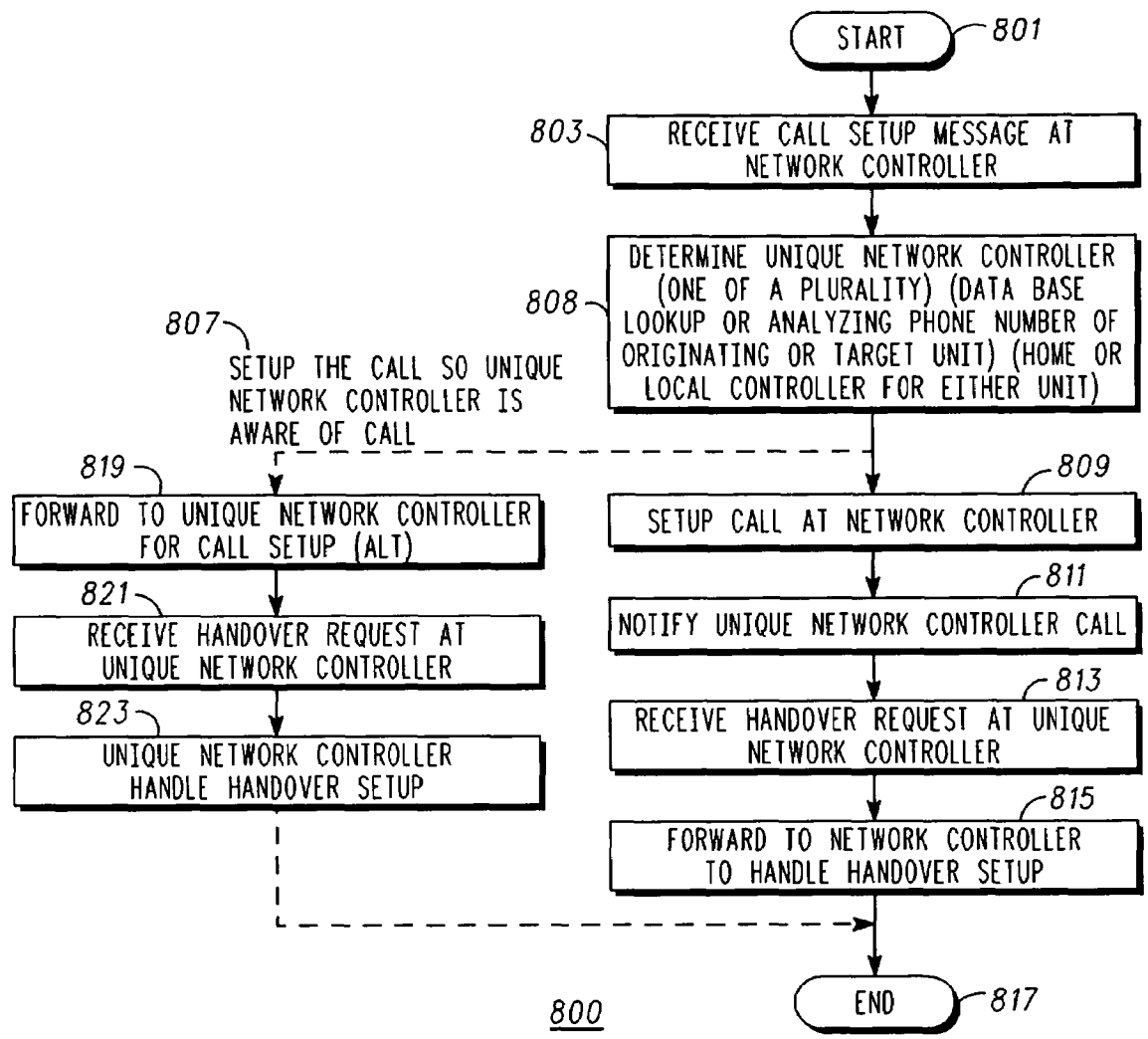
FIG. 8 illustrates a flow chart of a method embodiment of call routing to facilitate handover of a call.

Referring to FIG. 8, a flow chart of a method embodiment of call routing in an enterprise network to facilitate a hand over of the call will be discussed and described. Note that this method can be practiced using the communication units, network controllers, etc discussed above or other similar apparatus with similar functionality. Never-the-less much of this discussion will as required reference the above figures and will be provided in an overview form in order to avoid undue duplication of some of the above discussions and descriptions. Generally FIG. 8 shows a method in a wireless communication unit or similar device, where the method is directed to routing a call that is being originated to facilitate a subsequent handover. The method begins at 801 and then at 803 receiving at a network controller a call setup request from a call originating unit for a call to a call target unit is shown. Next at 808, the method includes determining a unique network controller of a plurality of controllers to effect a handover of the call between the enterprise network and a wide area network. This determining can be accomplished by searching a database that cross references network controllers with communication units or by analyzing a phone number of either the originating or target units. Such phone numbers tend to reflect a home network controller for the communication unit, e.g. are site specific. Generally the unique network controller will be determined in accordance with enterprise rules and may, for example, be the home network controller for the originating CU or the target CU, or it may be the local or visited network controller for either unit.

Next at 807, the call is setup such that the unique network controller is aware of the call. Various approaches are depicted. One approach shows at 809 setting up the call at the network controller that received the call request or some network controller other than the unique network controller. Then, after determining the unique network controller, at 811 the method notifies the unique network controller when the call is being setup by the network controller at 809 as well as when the call ends. This notification will need to include identification information, such as a network address and the like of the network controller that is handling the call setup. As noted above the unique network controller will be informed of the call setup and since it is the controller that will receive any handover requests 813 it can send and the network controller handling the call can receive a request for the handover of the call from the unique network controller and thus handle the handover setup 815.

Alternatively, as suggested by the dotted line to 819, the call request can be forwarded to the unique network controller for setting up the call. Then at 821 the unique network controller may receive any handover requests and handle or setup such handover requests 823. In either case the method ends at 817 but may repeat as necessary. Thus with reference to FIG. 7 and FIG. 8 the receiving the call request can include receiving at a first visited network controller the call setup request from a wireless communication unit that is visiting an enterprise site managed by the first visited network controller; and the determining the unique network controller can result in, for example determining a first home network controller associated with the wireless communication unit and forwarding the call setup request to the first home network controller associated with the wireless communication unit for setting up the call. Alternatively this can include determining a second home network controller associated with a target wireless communication unit and forwarding the call setup request to the second home network controller for setting up the call. In yet another embodiment the determination of the unique network controller may comprise determining a second visited network controller for another enterprise site managed by the second visited network controller where the target wireless communication unit is operating and forwarding the call setup request to the second visited network controller for setting up the call.

Thus various methods and apparatus have been described for routing and managing calls to facilitate handover of such calls, subsequent to those calls being setup in multi site enterprise networks.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A wireless communication unit comprising:
    a transceiver suitable to support an air interface with an enterprise network and an air interface with a wireless wide area network (WWAN);
    a memory operable to store information suitable for identifying one or more of a plurality of enterprise controllers, each of the plurality of enterprise controllers for controlling a corresponding one of a plurality of wireless local area networks (WLAN), the plurality of enterprise controllers comprising a home enterprise controller for the wireless communication unit and a visited enterprise controller for controlling a visited one of the plurality of WLANs that is visited by the wireless communication unit; and
    a controller configured and cooperatively operable with the memory and the transceiver to facilitate:
        operating on the visited one of the plurality WLANs;
        setting up a call while operating on the visited one of the plurality of WLANs,
        obtaining information to facilitate identification of the visited enterprise controller, and
        using the information to hand over the call from one to another of the enterprise network and the WWAN.

2. The wireless communication unit of claim 1 wherein the controller is further operable to process the information to provide an address suitable for contacting the visited enterprise controller.

3. The wireless communication unit of claim 2 wherein the address suitable for contacting the visited enterprise controller corresponds to one of: an Internet Protocol (IP) address; a Uniform Resource Indicator (URI); a phone number; and an index to a table of addresses stored in the memory.

4. The wireless communication unit of claim 1 wherein the controller cooperatively with the transceiver is further operable to facilitate: receiving a message corresponding to setup for the call, determining whether the information is included with the message, and, when the information is included in the message, storing the information in the memory.

5. The wireless communication unit of claim 4 wherein the information comprises one of a calling party identifier and a called party identifier.

6. The wireless communication unit of claim 4 wherein the transceiver receives the message while operating in the enterprise network and wherein the information has been inserted in the message by one of the unique enterprise controller and the home enterprise controller.

7. The wireless communication unit of claim 1 wherein the controller cooperatively with the transceiver is further operable to associate with the enterprise network and to use the information to contact the visited enterprise controller to initiate the hand over of the call.

8. The wireless communication unit of claim 1 wherein the information is provided to the controller and stored in the memory during one of: a provisioning process for the wireless communication unit, a registration exchange with one of the plurality of enterprise controllers, and the reception an overhead message while operating on the visited one of the plurality of WLANs.

9. The wireless communication unit of claim 8 wherein the controller cooperatively with the transceiver is operable to use the information to contact the visited enterprise controller and initiate a handover of the call.

10. The wireless communication unit of claim 9 wherein the contacting the visited enterprise controller a call setup to a local area network address when the wireless communication unit is operating in the enterprise network and a call setup to a public switched telephone number when the wireless communication unit is operating in a wireless wide area network.

11. The wireless communication unit of claim 1 wherein the controller is further operable:
    to contact the visited enterprise controller to initiate the hand over of the call from one of the enterprise network and the WWAN;
    to detect that the hand over failed; and
    when the handover failed:
        put the call on hold in the one of the enterprise network and WWAN;
        establish an other call to itself from the one of the enterprise network and the WWAN to the other of the enterprise network and the WWAN; and
        continue the call on the other of the enterprise network and the WWAN by transferring the call to the other call.

12. The wireless communication unit of claim 11 wherein the controller is further operable to transfer the call to the other call by requesting the one of the enterprise network and the WWAN to transfer the call to the other call.

13. An enterprise network controller operable to route calls for at least one wireless communication unit to facilitate hand over of the calls between an enterprise network and a wide area network, the enterprise network controller being a home enterprise network controller of the at least one wireless communication unit, the enterprise network comprising a plurality of wireless local area networks (WLANs), each of the plurality of WLANs controlled by one of a plurality of enterprise network controllers the wide area network being controlled by at least one mobile switching center, the at least one wireless communication unit operating on a visited one of the plurality of WLANs, the enterprise network controller comprising:
    a switching function coupled to one of the plurality of WLANs and a wide area network; and
    a controller coupled to the switching function and the one of the plurality WLANs, the controller operable to process a call for at least one wireless communication unit, identify a visited enterprise network controller, wherein the visited enterprise network controller is one of a plurality of enterprise network controllers controlling the visited one of the plurality of WLANs and set up the call so the visited enterprise network controller is aware of the call.

14. The enterprise network controller of claim 13 wherein the setting up the call so the visited enterprise network controller is aware of the call comprises forwarding the call setup request to the visited enterprise network controller for call processing, whereby the visited enterprise network controller will setup the call.

15. The enterprise network controller of claim 13 wherein the controller is operable to identify the visited enterprise network controller by one of accessing a database to identify the visited enterprise network controller and analyzing calling party identification of the unique network controller assigned to the call originating wireless communication unit.

16. The enterprise network controller of claim 13 wherein the controller is operable to identify the visited enterprise by analyzing called party identification for the call.

17. The enterprise network controller of claim 13 wherein the setting up the call so the visited enterprise network controller is aware of the call comprises notifying the visited enterprise network controller when the call is being setup and when the call ends.

18. The enterprise network controller of claim 17 wherein the controller after notifying the visited enterprise network controller when the call is being setup, receives a request from the visited enterprise network controller for the handover of the call between the enterprise network and the wide area network.

19. A method of managing and routing calls to a target unit in a visited wireless local area network (WLAN) of an enterprise network to facilitate hand over of the calls from the visited WLAN to a wireless wide area network (WWAN), the enterprise including a plurality of enterprise network controllers including a home enterprise network controller on which terminates a phone number for the target unit and a visited enterprise network controller for controlling the visited WLAN, the WWAN including at least one mobile switching center, the method comprising:
   receiving at one of a plurality of enterprise network controllers a call setup request from a call originating unit for a call to a call target unit;
   determining at one of the plurality of enterprise network controllers the visited enterprise network controller; and
   setting up the call so the visited enterprise network controller is aware of the call.

20. The method of claim 19 where the setting up the call so the visited enterprise network controller is aware of the call comprises forwarding the call setup request to the visited enterprise network controller and wherein the setting up the call is handled by the visited enterprise network controller.

21. The method of claim 19 wherein the determining the visited enterprise network controller further comprises one of accessing a database to identify the home enterprise network controller of the target unit and analyzing an identifier of the target unit, the identifier being one of a phone number, an IP address and a URI.

22. The method of claim 19 further comprising, after determining the visited enterprise network controller, notifying the visited enterprise network controller when the call is being setup and when the call ends.

23. The method of claim 22 further comprising, after notifying the visited enterprise network controller when the call is being setup, receiving a request for the handover of the call from the visited enterprise network controller.

24. The method of claim 19 wherein:
   the call originating unit is in an other visited WLAN of the enterprise network;
   the one of the plurality of enterprise network controllers is for controlling the other visited WLAN; and
   the determining the visited enterprise network controller further comprises one of:
      determining a home enterprise network controller of the call originating unit on which terminates a phone number for call originating unit and forwarding the call setup request to the home enterprise network controller of the call originating unit for setting up the call, and
      determining a home enterprise network controller of the target unit and forwarding the call setup request to the home enterprise network controller of the target unit for setting up the call.

* * * * *